Sept. 13, 1966  W. J. READING  3,272,309
EGG HANDLING APPARATUS
Filed Sept. 1, 1964  2 Sheets-Sheet 1
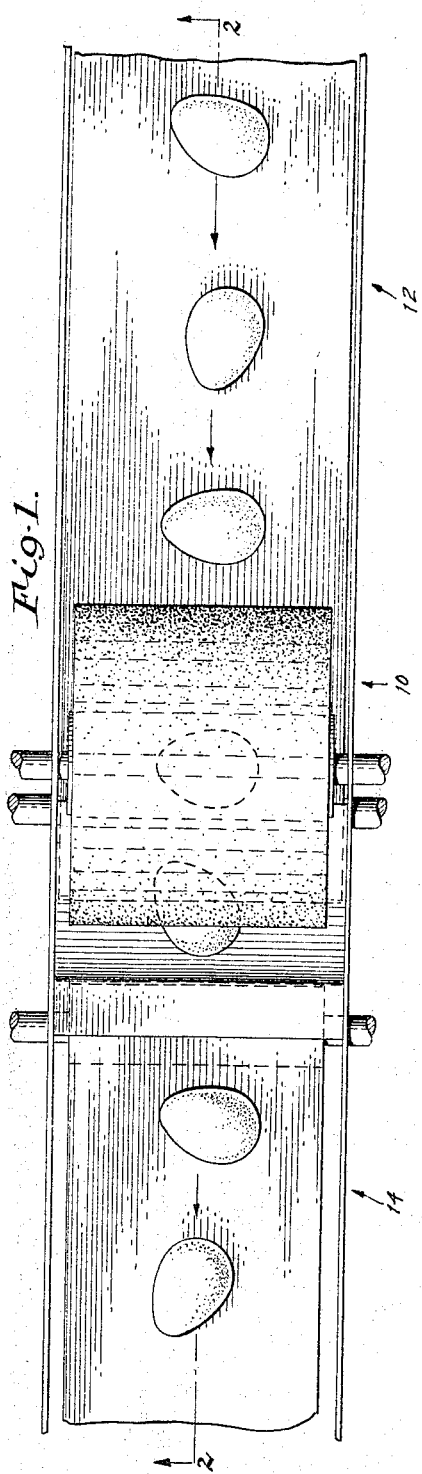
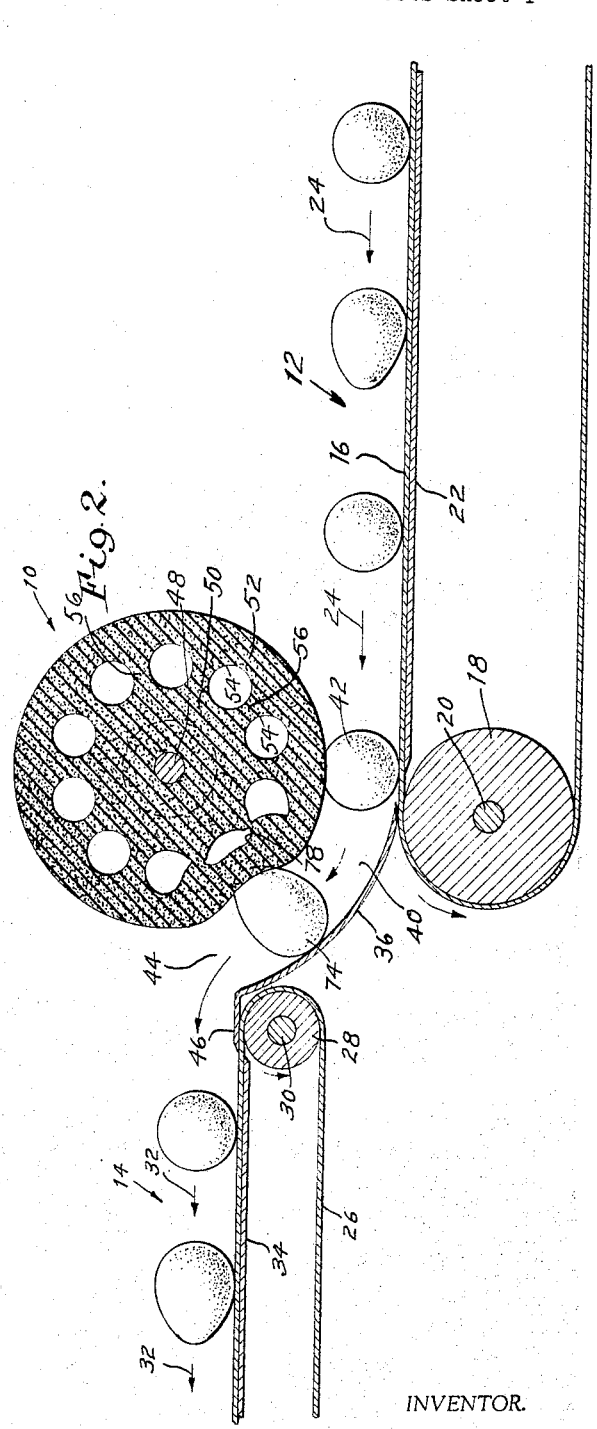
INVENTOR.
WALTER J. READING
BY Bean, Brooks, Buckley & Bean
ATTORNEYS

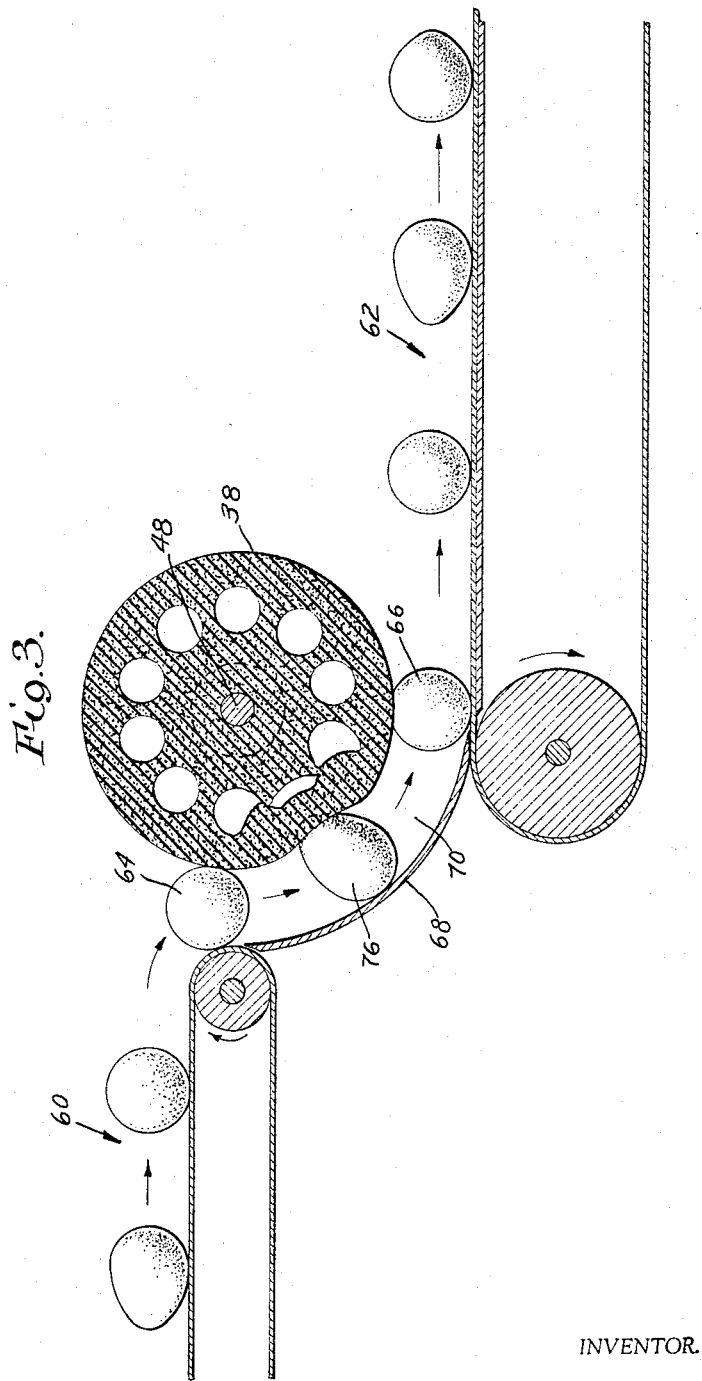

United States Patent Office 3,272,309
Patented Sept. 13, 1966

3,272,309
EGG HANDLING APPARATUS
Walter J. Reading, Ottumwa, Iowa, assignor, by mesne assignments, to Barker Poultry Equipment Company, Ottumwa, Iowa, a corporation of Iowa
Filed Sept. 1, 1964, Ser. No. 393,648
14 Claims. (Cl. 198—25)

This invention relates to egg handling systems and pertains, more particularly, to means for handling eggs in which the eggs are transferred from one level to another during the handling process.

In egg handling systems, such as systems for successively washing, candling, grading and packing eggs, it is often desirable to arrange the system in such fashion that the eggs are disposed or transferred from one level to another from a lower level to a higher level or vice versa. However, such transfer of the eggs must be accomplished in a positive fashion if jamming, stalling or forceful impingement, and the danger of breakage attendant thereto, are to be avoided. On the other hand, positive feed devices tend to subject the eggs to rough treatment, which in itself may produce breakage, unless rather elaborate means are employed to obviate such treatment. Whereas is true that under some circumstances elaborate and space-consuming positive feed devices are justified, there are many instances in which a simple, compact and economical positive device for raising or lowering eggs is desirable. It is a primary object of this invention to provide such a device. By "positive" as used herein is meant a device in which the motion of the eggs is at all times controlled as opposed to a device which the egg motion is momentarily or otherwise uncontrolled and thus unpredictable. An egg freely rolling down a ramp or chute is an example of uncontrolled motion whereas an egg resting in a pocket on a moving conveyor belt is an example of controlled motion within the meaning of "positive" as used herein.

It is of primary concern in connection with the present invention to provide a device for transferring eggs from one level to another in a positive fashion and while occupying a minimum of space. At the same time, it is of concern in connection with this invention to achieve these results in such gentle fashion that breakage is substantially eliminated, even when handling eggs which have already been cracked.

Further, it is an object of this invention to provide an improved form of egg lowering mechanism operating upon principles which also render the device capable of elevating eggs.

Another object of this invention resides in the provision of an improved egg handling system incorporating a transport member cooperable with a ramp element to form an egg-transporting channel therebetween, in which the eggs are carefully yet positively handled for either raising or lowering from one elevation or level to another.

Another object of this invention resides in the provision of an improved egg handling system embodying a cylindrical egg transport member cooperating with a ramp assembly as aforesaid, wherein the transport member is formed of resilient material and is provided with voids or openings in circumferentially spaced relationship to normally achieve a positive elevating or lowering of the eggs while, at the same time, handling the eggs in a gentle fashion and also accommodating for gross variations in size of the article gripped as may occur when an egg is presented in end-to-end relation to the assemblabe rather than across the minor diameter thereof.

Other objects and advantages of the invention will appear from the description hereinbelow and the accompanying drawing wherein:

FIG. 1 is a plan view showing a portion of an egg handling system incorporating the principles of the present invention;

FIG. 2 is a vertical section taken substantially along the plane of section line 2—2 in FIG. 1; and FIG. 3 is a view similar to FIG. 2 but illustrating the lowering of eggs rather than the elevating of eggs as is shown in FIG. 2.

With reference now more particularly to FIG. 1, in the system as is shown therein, the eggs being handled are transported from a lower level to a higher level by the transport means indicated generally by the reference character 10. The reference character 12 indicates generally means for delivering eggs to an input region or area of the means 10 whereas the reference character 14 indicates generally means for delivering the eggs away from a discharge region or area of the means 10. As can be seen more clearly in FIG. 2, the means 12 for delivering the eggs to the means 10 may simply comprise an endless belt 16 trained at one end thereof over a drive roller 18 fixed to and supported by a suitable drive shaft 20. A table or platform 22 may underlie the upper flight of the endless belt 16 upon which the eggs, as shown, rest for transporting in the direction of the arrows indicated by the reference character 24. Similarly, the means 14 may comprise simply an endless belt 26 trained over a suitable roller 28 at one end thereof, which roller is mounted upon the shaft 30 which may be utilized to impart drive to the belt so that the upper flight thereof may transport the eggs as indicated by the arrows 32. As in the case with the means 12, the assembly 14 may also include a platform or table 34 substantially as is shown.

The means 10 includes a ramp 36 and a transport member 38 which cooperates to define an egg-transport channel 40 therebetween. At the level of the means 12, there is an input region or area occupied in FIG. 2 by the egg 42 and at the opposite end of the channel 40 is a discharge region or area 44 whereat the eggs are discharged onto the apron portion 46 of the ramp whereupon they roll onto the endless belt 26, substantially as is shown. The transport means 38 is supported by a drive shaft 48 and in the case of elevating eggs as is shown in FIGS. 1 and 2, the level of the upper flight of the means 14 must be somewhat below the axis of the drive shaft 48. The transport member 38 proper includes a core portion 50 and a peripheral drive portion 52, which portions are separated by series of voids or openings 54 which define a plurality of radial legs or spokes 56 which serve as a sole means for joining the two portions 50 and 52. The transport member 38 is formed of resilient material, preferably foam or sponge rubber and the interaction between the resilient material of the transport member 38 and the voids or openings 54 will be presently apparent.

With reference now more particularly to FIG. 3, the assemblage shown therein is utilized for lowering eggs from the level of the delivery means 60 to the level of the receiving means 62. The transport wheel 38 is the same as in FIG. 2 but it will be noted that the level of the delivery means 60 may, in this case, be slightly above the center line of the drive shaft 48. Thus, with the same size wheel, eggs may be lowered a greater distance than they may be raised.

In the egg lowering mechanism shown in FIG. 3, the egg 64 occupies the input region or area whereas the egg 66 occupies the discharge region or area. The ramp 68 of FIG. 3 is correspondingly longer than the ramp 36 of FIG. 2 since the extent of the egg-transport channel 70 is greater in the case of egg lowering with the same size transport wheel 38 although it will be appreciated that it need not be. However, to minimize the space required by the component parts, it is preferable to utilize the maximum reach of the transport wheel 38 in combination with the ramp 36 or 68. That is to say, if, in FIG. 3, the means 60 and 62 are separated by a lesser vertical extent than is shown, it would then be preferable to utilize a smaller diameter transport member 38.

As was described in connection with FIG. 2, the transport member 38 is separated into inner core portion 50 and the drive or outer portion 52 which are separated by the voids or openings 54 and which are interconnected only by the legs or webs 56 which are between adjacent voids 54. There are several relationships of the voids 54 which are desirable in connection with either raising or lowering. In the first place, it will be appreciated that the egg channel 40 or 70 will in any case be of less width than the minimum width of any egg which is anticipated to be handled by the system so that in all cases, a positive gripping action occurs. However, in conjunction with this, the radial diameter or dimension of the voids or openings 54 is such that this radial dimension plus the width of the egg channel 40 or 70 is greater than the length of any egg which may be handled by the system. The reason for this is that eggs may occasionally be turned end for end when presented to the transport mechanism at the input region or area thereof. If such occurs, as is shown for the egg 74 in FIG. 2 or for the egg 76 in FIG. 3, the resilient material of the transport member will compress as will the openings or voids immediately in the area of a so-oriented egg. However, it is not desirable that the voids such as the void 78 in FIG. 2 completely close or collapse in order to obviate excessive gripping action on the egg 74. At the same time, the circumferential dimension of the voids 54 should be such that several of the legs or webs 56 are encompassed within the longitudinal extent of the egg channel 40 or 70. The reason for this is to permit localized deformation of the drive portion 52 of the transport member 38 so that in regions immediately to either side of the gripped egg, the periphery of the transport member 38 will assume its normal cylindrical configuration so that next adjacent eggs on either side of the egg 74 will still be positively gripped. Thus, the particular configuration of the transport member 38 allows a maximum of accommodation in the gripping portion 52 of the transport member 38 so as to not only gently grip an egg no matter how it is presented to the assemblage but also to permit recovery of the mechanism so as to enable it to grip adjacent eggs positively and without chance of slippage such as might otherwise cause adjacent eggs to collide and thus break. A representative dimension for the voids 54 is approximately one and one-eighth inches when such voids are formed by circular openings extending axially through the transport member.

It is also important in connection with the present invention that the peripheral velocity of the transport member 38 be in the order of about twice the linear velocity of eggs delivered to the input region. If the peripheral velocity of the transport member 38 is exactly twice the linear velocity of the belt 16 for example in FIG. 2, then the same spacing will be detained between eggs as they are discharged from the discharge region 44 as is maintained between the eggs as they are carried by the belt 16. In this way, the eggs will not bunch up and tend to collide on the discharge mechanism 14. The same is of course true in the construction shown in FIG. 3.

It is to be understood that certain changes and modifications as illustrated and described may be made without departing from the spirit of the invention or the scope of the following claims.

I claim:

1. A device for transferring eggs from one level to another comprising, in combination,
means at one level for delivering eggs to an input area,
means for receiving and transporting eggs from a discharge area located at a level different from said one level,
an arcuate ramp bridging between said input and discharge areas,
a cylindrical transport member having a peripheral surface portion disposed in spaced relation to said ramp to define an egg-transport channel having said input and discharge areas at the opposite ends thereof, said transport member being formed of resilient material and having a series of circumferentially spaced openings extending axially therethrough in radially inwardly spaced relation to the peripheral surface of said transport member,
and means for rotating said transport member.

2. A device for handling eggs comprising, in combination,
driven means for delivering eggs at a predetermined linear velocity to an input region located at one level,
driven means for delivering eggs from a discharge region located at a level different from said one level,
a ramp bridging between said input and discharge regions,
a transport member having a flat, cylindrical peripheral surface having a portion thereof disposed in spaced relation to said ramp by an amount less than the minimum dimension of the eggs being handled to define an egg-transport channel having said input and discharge regions at the opposite ends thereof, said transport member being formed of resilient material and having a series of circumferentially spaced openings extending axially therethrough in radially inwardly spaced relation to said peripheral surface thereof,
and means for driving said transport member at a rotational speed producing a peripheral velocity which is substantially twice as great as said predetermined linear velocity.

3. In an egg handling system for transferring eggs from one level to another,
a ramp
a cylindrical transport member mounted for rotation about its axis and having a peripheral surface portion disposed in spaced relation to said ramp to define an egg-transport channel therewith, said channel being of a width less than the minimum dimension of eggs to be handled, said transport member being formed of resilient material and having a series of circumferentially spaced voids therein located radially inwardly from the peripheral surface thereof, the radial dimensions of said voids plus the width of said egg channel being greater than the maximum diameter of eggs to be handled,
and means for rotating said transport member.

4. In an egg handling system for transferring eggs from one level to another comprising, in comination,
a ramp,
a cylindrical transport member mounted for rotation about its axis, said transport member being formed of resilient material and having a series of circumferentially spaced voids therein separating said transport member into an inner core portion and an outer drive portion with such portions being joined by radial legs between the voids, the peripheral surface of said transport member being spaced from said ramp to define an egg-transport channel therewith having a width less than the minimum dimension of eggs to be handled, the width of said channel plus the radial dimension of said voids being greater than the maximum dimension of eggs to be handled,
and means for rotating said transport member.

5. A device for transferring eggs from one level to another comprising, in combination, means at one level for delivering eggs to an input area, means for receiving and transporting eggs from a discharge area located at a level different from said one level, an arcuate ramp bridging between said input and discharge areas, a cylindrical transport member having a peripheral surface portion disposed in spaced relation to said ramp to define an egg-transport channel having said input and discharge areas at the opposite ends thereof, said transport member being formed of resilient material and having a series of circumferentially spaced openings extending axially therethrough in radially inwardly spaced relation to the peripheral surface of said transport member, the vertical spacing between said means being in the order of one-half the diameter of said transport member, and means for rotating said transport member.

6. A device for transferring eggs from one level to another comprising, in combination, means at one level for delivering eggs to an input area, means for receiving and transporting eggs from a discharge area located at a level different from said one level, an arcuate ramp bridging between said input and discharge areas, a rotatable transport member having a cylindrical peripheral surface and disposed in spaced relation to said ramp to define therewith an egg-transport channel having said input and discharge areas at the opposite ends thereof, said transport member being formed of resilient material and having a series of circumferentially spaced openings extending axially therethrough in radially inwardly spaced relation to the peripheral surface of said transport member, the vertical spacing between said means being in the order of one-half the diameter of said transport member, and said ramp having its center of curvature coincident with the axis of rotation of said transport member, and means for rotating said transport member.

7. In an egg handling system for transferring eggs from one level to another, an arcuate ramp, a cylindrical transport member mounted for rotation about its axis and having a peripheral surface portion disposed in spaced relation to said ramp to define an egg-transport channel therewith, said channel being of a width less than the minimum dimension of eggs to be handled, said transport member being formed of resilient material and having a series of circumferentially spaced voids therein located radially inwardly from the peripheral surface thereof, the opposite ends of said egg-transport channel being spaced vertically by a amount in the order of one-half the diamter of said transport member, and means for rotating said transport member.

8. In an egg handling system for transferring eggs from one level to another, an arcuate ramp, a cylindrical transport member mounted for rotation about its axis and having a peripheral surface portion disposed in spaced relation to said ramp to define an egg-transport channel therewith, said channel being of a width less than the minimum dimension of eggs to be handled, said transport member being formed of resilient material and having a series of circumferentially spaced voids therein located radially inwardly from the peripheral surface thereof, the opposite ends of said egg-transport channel being spaced vertically by an amount in the order of one-half the diameter of said transport member, the radial dimensions of said voids plus the width of said channel being greater than the maximum diameter of eggs to be handled, and means for rotating said transport member.

9. In an egg handling system for transferring eggs from one level to another comprising, in combination, an arcuate ramp, a cylindrical transport member mounted for rotation about its axis and having its axis coincident with the center of curvature of said ramp, said transport member being formed of resilient material and having a series of circumferentially spaced voids therein separating said transport member into an inner core portion and an outer drive portion with such portions being joined by radial legs between the voids, the peripheral surface of said transport member being spaced from said ramp to define an egg-transport channel therewith having a width less than the minimum dimension of eggs to be handled, the width of said channel plus the radial dimension of said voids being greater than the maximum dimension of eggs to be handled, and means for rotating said transport member.

10. A device for handling eggs comprising, in combination, driven means for delivering eggs at a predetermined linear velocity to an input region located at one level, driven means for delivering eggs from a discharge region located at a level different from said one level, a ramp bridging between said input and discharge regions, a transport member having a flat, cylindrical peripheral surface having a portion thereof disposed in spaced relation to said ramp by an amount less than the minimum dimension of the eggs being handled to define an egg-transport channel having said input and discharge regions at the opposite ends thereof, said transport member being formed of resilient material and having a series of circumferentially spaced voids in radially inwardly spaced relation to said peripheral surface thereof, and means for driving said transport member at a rotational speed producing a peripheral velocity which is substantially twice as great as said predetermined linear velocity.

11. A device for handling eggs comprising, in combination, driven means for delivering eggs at a predetermined linear velocity to an input region located at one level, driven means for delivering eggs from a discharge region located at a level different from said one level, an arcuate ramp bridging between said input and discharge regions, a rotatably mounted transport member having a flat, cylindrical peripheral surface having a portion thereof disposed in spaced relation to said ramp by an amount less than the minimum dimension of the eggs being handled to define an egg-transport channel having said input and discharge regions at the opposite ends thereof, said transport member being formed of resilient material and having a series of circumferentially spaced voids in radially inwardly spaced relation to said peripheral surface thereof, the axis of said transport member and the center of curvature of said ramp being coicident, and the vertical spacing between said input and discharge regions being in the order of one-half the diameter of said transport member, and means for driving said transport member at a rotational speed producing a peripheral velocity which is substantially twice as great as said predetermined linear velocity.

12. In an egg handling system for transferring eggs from one level to another comprising, in combination,
an arcuate ramp,
a cylindrical transport member mounted for rotation about its axis and having its axis coincident with the center of curvature of said ramp, said transport member being formed of resilient material and having a series of circumferentially spaced voids therein separating said transport member into an inner core portion and an outer drive portion with such portions being joined by radial legs between the voids, the peripheral surface of said transport member being spaced from said ramp to define an egg-transport channel therewith having a width less than the minimum dimension of eggs to be handled, the width of said channel plus the radial dimension of said voids being greater than the maximum dimension of eggs to be handled, and the opposite ends of said egg-transport channel being vertically spaced by an amount in the order of one-half the diameter of said transport member,
and means for rotating said transport member.

13. A device for transferring eggs from one level to another comprising, in combination,
means at one level for delivering eggs to an input area,
means for receiving and transporting eggs from a discharge area located at a level different from said one level,
an arcuate ramp bridging between said input and discharge areas,
a cylindrical transport member disposed in substantially uniformly spaced relation to said ramp to define therewith an egg-transport channel having said input and discharge areas at the opposite ends thereof, said transport member being locally deformable to accommodate, without breakage, eggs that may be received within said channel,
the vertical spacing between said means being in the order of one-half the diameter of said transport member,
and means for rotating said transport member.

14. A device for handling eggs comprising, in combination,
driven means for delivering eggs at a predetermined linear velocity to an input region located at one level,
driven means for delivering eggs from a discharge region located at a level different from said one level,
a ramp bridging between said input and discharge regions,
a rotatable transport member disposed in spaced relation to said ramp by an amount less than the minimum dimension of the eggs being handled to define therewith an egg-transport channel having said input and discharge regions at the opposite ends thereof, said transport member being locally deformable to accommodate, without breakage, eggs that may be received within said channel,
and means for driving said transport member at a rotational speed producing a peripheral velocity which is substantially twice as great as said predetermined linear velocity.

References Cited by the Examiner

UNITED STATES PATENTS

| | | | |
|---|---|---|---|
| 2,729,046 | 1/1956 | Patterson | 56—328 |
| 3,127,172 | 3/1964 | Troiand | 198—221 X |

FOREIGN PATENTS

| | | |
|---|---|---|
| 903,701 | 1/1945 | France. |
| 1,036,391 | 4/1953 | France. |

MARVIN A. CHAMPION, *Primary Examiner.*